United States Patent [19]

Ewen

[11] Patent Number: 5,631,202

[45] Date of Patent: *May 20, 1997

[54] STEREOSPECIFIC METALLOCENE CATALYSTS WITH STEREOLOCKING α-CP SUBSTITUENTS

[75] Inventor: John A. Ewen, Houston, Tex.

[73] Assignee: Montell Technology Company B.V., Netherlands

[*] Notice: The term of this patent shall not extend beyond the expiration date of Pat. No. 5,459,117.

[21] Appl. No.: 126,795

[22] Filed: Sep. 24, 1993

[51] Int. Cl.$^6$ .................................................. C08F 4/643
[52] U.S. Cl. .................... 502/117; 502/103; 502/152; 502/155; 556/7; 556/11; 556/43; 556/53; 534/15; 576/127; 576/134; 576/160; 576/351; 576/943
[58] Field of Search ............................ 502/103, 117, 502/152, 155; 556/7, 11, 43, 53; 534/15

[56] References Cited

U.S. PATENT DOCUMENTS

| | | | |
|---|---|---|---|
| 3,258,455 | 6/1966 | Natta et al. | 526/169.2 |
| 3,305,538 | 2/1967 | Natta et al. | 526/139 |
| 3,364,190 | 1/1968 | Emrick | 526/139 |
| 3,893,989 | 7/1975 | Leicht et al. | 526/73 |
| 4,200,171 | 4/1980 | Seymour et al. | 181/287 |
| 4,287,328 | 9/1981 | Kikuta et al. | 526/115 |
| 4,316,966 | 2/1982 | Mineshima et al. | 525/53 |
| 4,530,914 | 7/1985 | Ewen et al. | 502/113 |
| 4,794,096 | 12/1988 | Ewen | 502/117 |
| 4,852,851 | 8/1989 | Webster | 251/61.1 |
| 4,892,851 | 1/1990 | Ewen et al. | 502/104 |
| 4,935,474 | 6/1990 | Ewen et al. | 526/114 |
| 4,975,403 | 12/1990 | Ewen | 502/113 |
| 5,036,034 | 7/1991 | Ewen | 502/117 |
| 5,122,583 | 6/1992 | Ewen et al. | 526/115 |
| 5,132,262 | 7/1992 | Rieger et al. | 502/117 |
| 5,155,080 | 10/1992 | Elder et al. | 502/152 |
| 5,225,500 | 7/1993 | Elder et al. | 526/127 |
| 5,225,550 | 7/1993 | Jahne | 544/277 |
| 5,268,495 | 12/1993 | Riepl et al. | 556/11 |
| 5,296,434 | 3/1994 | Karl et al. | 502/117 |
| 5,416,228 | 5/1995 | Ewen et al. | 556/7 |
| 5,459,117 | 10/1995 | Ewen | 502/117 |

FOREIGN PATENT DOCUMENTS

| | | |
|---|---|---|
| 2055218 | 5/1992 | Canada. |
| 0277003 | 8/1988 | European Pat. Off.. |
| 0277004 | 8/1988 | European Pat. Off.. |
| 0426638 | 5/1991 | European Pat. Off.. |
| 0427697 | 5/1991 | European Pat. Off.. |
| 0537130 | 4/1993 | European Pat. Off.. |

OTHER PUBLICATIONS

Spaleck, W.; Antberg, M.; Rohrmann, J.; Winter A.; Bachmann, B.; Kiprof, P.; Behm, J.; Herrmann, W.J.; *Angew. Chem. Int. Ed. Engl.*, 1992, 31, 1347.
Mallin, D.T.; Rausch, M.D.; Lin, Y.G.; Dong, S.H.; Chien, J.C.W.; *J. Am. Chem. Soc.*, 1990, 112, 2030.
Jordan, R.F.; Dasher, W.E.; Echols, S.F., *J. Amer. Chem. Soc.*, 1986, 108, 1718.
Eisch, J.J.; Piotrowski, A.M.; Brownstein, S.K.; Gabe, E.J.; Lee, F.L., *J. Amer. Chem. Soc.*, 1985, 107, 7219.
Ewen, J.A.; Jones, R.L.; Razavi A.; Ferrara, J.D., *J. Amer. Chem. Soc.*, 1988, 110, 6255.
Ewen, J.A., *J. Amer. Chem. Soc.*, 1984, 106, 6355.
*Organometallics*, 1988, 7, 1828. Fendrick C.M.
*Journal of Organic Chemistry* 29, 2951 (1964). Skattebal, L.
Yang, X.; Stern, C.L.; Marks, T.J.; *J. Am. Chem. Soc.* 1991, 113, 3623.
Zambelli, A. et al., "Isotactic Polymerization of Propene: Homogeneous Catalysts Based on Group 4 Metallocenes Without Methylaluminoxane," *Macromolecules* 1989, 22, pp. 2186–2189.
Farina, M.; Di Silvestro, G.; Sozzani, P., *Macromolecules*, 1982, 15, 1451.
Besancon, J.; Top, S., *J. Organomet. Chem.*, 1977, 127, 139.
Ewen, J.A., Elder, M.J., Jones, R.L., Haspeslagh, Luc, Atwood, Jerry L., Bott, Simon G., Robinson, Kerry, "Metallocene/Polypropylene Structural Relationships: Implications On Polymerization And Stereochemical Control Mechanisms", *Makromol. Chem. Macromol. Symp.* 48/49, 253–295 (1991).
Ewen, J.A., Elder, M.J., Jones, R.L., Curtis, S., Cheng, H.N., "Syndiospecific Propylene Polymerizations with iPr [CpFlu] ZrCl$_2$," pp. 439–443.
Ewen, J.A., Elder, M.J., "Syntheses and Models for Stereospecific Metallocenes," *Makromol. Chem., Macromol. Symp.* 66, 179–190 (1993).
Ewen, J.A., Haspeslagh, Luc, Elder, M.J., Atwood, J.L., Zhang. H., Cheng, H.N., "Propylene Polymerizations with Group 4 Metallocene/Alumoxane Systems," pp. 281–289.
Cavallo, L.; Guerra, G. Vacatello, M.; Corradini, P. *Macromolecules*, 1991, 24, 469.
Coughlin; E. B., Bercaw, J.E. *J. Amer. Chem. Soc.*, 1992, 114, 7606.
Hortmann, K.; Brintzinger, H.H., *New J. Chem.*, 1992, 16, 51.
Aggarwal, M.; Geanangel, R.A.; Ghuman, M.A., *Main Group Metal Chemistry*, 1991, 14, 263.
Halterman, R.L., *Chem. Rev.*, 1992, 92, 965.
Skatterbol, L. *Tetrahedron*, 1967, 23, 1107.
Roll, W.; Brintzinger, H.H.; Rieger, B.; Zolk, R., *Angew. Chem. Int. Ed. Engl.*, 1990, 29, 279.*
Larock, R.C., *Comprehensive Organic Transformations*, 1989, VCH Publishers, Inc., New York*.

*Primary Examiner*—Mark Nagumo
*Attorney, Agent, or Firm*—Gilbreth & Strozier, P.C.; Robert W. Strozier; J. M. Gilbreth

[57] ABSTRACT

Isospecific and/or syndiospecific catalysts and processes for the propagation of an isotactic and/or syndiotactic polymer chain derived from an ethylenically unsaturated monomer which contains 3 or more carbon atoms or is a substituted vinyl compound. The catalysts comprise a stereorigid, stereodirected and stereolocked metallocene and/or metallocene cation catalysts, characterized by having β stereodirecting substituents and α stereolocking substituents such that the catalysts have overall either $C_s$ or $C_2$ (or pseudo-$C_s$ or $C_2$) symmetry and such that the substituents define the orientation of the growing polymer chain end and resulting in tactioselectivity of successive monomer additions. Methods are also described for the preparation and use of these unique catalysts.

7 Claims, No Drawings

STEREOSPECIFIC METALLOCENE CATALYSTS WITH STEREOLOCKING α-CP SUBSTITUENTS

TECHNICAL FIELD

This invention relates to unique catalysts and processes using the unique catalyst for the production of isotactic and/or syndiotactic polymers which can be prepared essentially free of defects.

More particularly, the present invention relates to production of a isotactic and/or syndiotactic polyolefin by polymerization of ethylenically saturated olefins over a metallocene catalyst or catalyst precursor having a bridged cyclopentadienyl metallocene ligand bearing α and β substituents that stereodirect and stereolock the polymer chain and coordinated monomer into a specific orientation such that tactiospecific polymers are produced and that render the catalyst or catalyst precursor $C_2$ or pseudo-$C_2$ symmetric in the case of isospecific catalysts or catalyst precursors or $C_s$ or pseudo-$C_s$ symmetric in the case of syndiospecific catalysts or catalyst precursors.

BACKGROUND OF THE INVENTION

Polyolefins can be prepared with variety of steric configurations that correspond to the manner in which each new monomer unit is added to a growing polyolefin chain. Four basic configurations are commonly recognized for polyolefins, atactic, hemi-isotactic, isotactic and syndiotactic. Of course, a given polymer may incorporate regions of each steric configuration, yet not exhibit the pure or nearly pure configuration.

Atactic polymers exhibit no regular order of repeat units in the polymer chain, i.e., the substituents neither alternate nor maintain the same orientation relative to a hypothetical plane containing the polymer backbone (the plane is oriented such that the substituents on the asymmetric carbon atoms are either above or below the plane), but assume a random distribution of orientations. On the other hand, isotactic, syndiotactic, and hemi-isotactic polymers have unique and regularly repeating stereochemistries.

The isotactic structure is defined as having the substituents attached to the pseudo-asymmetric carbon atoms with the same relative steric configuration. In a Fischer projection with the polymer backbone portrayed in the plane of the paper (the horizontal line), the vertical line segments representing the substituents all appear on the same side of the polymer as represented by the horizontal line:

Another way of describing the isotactic structure is through the use of NMR. In Bovey's NMR nomenclature, an isotactic pentad is represented by ... mmmm ... with each "m" representing a "meso" dyad or successive substituents on the same side in the plane. As is well known in the art, any deviation, disruption, or inversion about a pseudo-asymmetric carbon in the chain will lower the degree of isotacticity and crystallinity of the polymer.

In contrast, the syndiotactic structure is typically described as having the substituents, that are attached to the pseudo-asymmetric carbon atoms, pseudo-enantiomorphically disposed, i.e., the substituents are oriented alternately and regularly above and below the main polymer chain. In a Fischer projection, the substituents alternate above and below the polymer backbone:

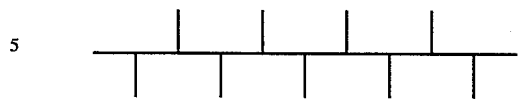

In NMR nomenclature, a syndiotactic pentad is represented by ... rrrr ... in which each "r" represents a "racemic" dyad, i.e., successive substituents on alternate sides of the plane. The percentage of r dyads in the chain determines the degree of syndiotacticity of the polymer.

There are other variations in polymer structures as well. One such variant is the so-called hemi-isotactic polymers. Hemi-isotactic polymers are ones in which every other pseudo-asymmetric carbon atom has its substituent oriented on the same side relative to the plane containing the polymer backbone in a Fischer projection. While, the other pseudo-asymmetric carbon atoms can have their substituents oriented randomly either above or below the plane. Since only every other pseudo-asymmetric carbon is in an isotactic configuration, the term hemi is applied. In a Fischer projection, the substituent configurational sequence for a hemi-isotactic polymer is shown below:

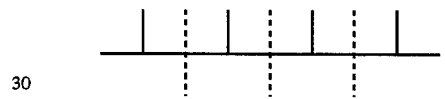

Isotactic and syndiotactic polymers are crystalline polymers and are insoluble in cold xylene. Crystallinity distinguishes both syndiotactic and isotactic polymers from hemi-isotactic or atactic polymers that are soluble in cold xylene and non-crystalline. Atactic polymers are typically a waxy product and not crystalline. While it is possible for a catalyst to produce all four types of polymers (atactic, hemi-isotactic, isotactic and syndiotactic), it is desirable for a catalyst to produce predominantly or essentially exclusively isotactic or syndiotactic polymer with very few to essentially no defects.

Catalysts that produce isotactic polyolefins are disclosed in U.S. Pat. Nos. 4,794,096 and 4,975,403, as well as European Pat. Appln. 0,537,130. Catalysts that produce syndiotactic polyolefins are disclosed in U.S. Pat. Nos. 3,258,455, 3,305,538, 3,364,190, 4,892,851, 5,155,080, and 5,225,500. Cationic metallocene catalysts are disclosed in European Patent Applications 277,003 and 277,004. Catalysts that produce hemi-isotactic polyolefins are disclosed in U.S. Pat. Nos. 5,036,034.

Although the catalysts described in the patents listed above are capable of generating polymers that have a relatively high stereoselectivity to a given tacticity, all are subject to various phenomena that introduce defects in the stereoregularity of the polymers. One common defect in the preparation of isotactic polymers is the occasional introduction of the wrong orientation disrupting the isotactic placement of monomer units, as shown below:

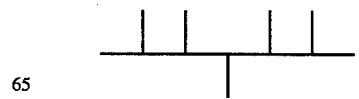

On the other hand, an analogous defect in syndiotactic polymers (i.e., the occasional introduction of the wrong orientation) is the so-called meso triad defect, shown below:

Thus, it would be a significant advancement in the art to be able to design and prepare stereospecific catalysts capable of generating stereoregular polymers essentially free of defects or where the amount and type of defects can be statistically controllable through catalyst design. Polypropylene with higher tactiospecificity will have a higher melting point and, therefore, will better suited for higher temperature applications such as the fabrication of ironable zippers for the clothing industry. Of course, other uses will be apparent as well.

SUMMARY OF THE INVENTION

The present invention provides isospecific and/or syndiospecific β stereodirected and a stereolocked metallocene catalysts, processes for preparing the catalysts, and processes for preparing isotactic and/or syndiotactic polyolefins derived from polymerizing ethylenically unsaturated monomers containing three (3) or more carbon atoms using the stereodirected and stereolocked catalysts.

The stereodirected and stereolocked metallocene catalysts incorporate a bridged cyclopentadienyl ring (sometimes abbreviated as Cp ring) ligand systems where the Cp rings bear substituents, other than hydrogen, that stereodirect and stereolock the polymer chain end conformation where the stereodirecting substituents are a set of β Cp substituents having different steric requirements (i.e, one substituent is sterically larger than the other) and where the stereolocking substituents are a second set of α Cp substituents and such that the resulting catalyst precursor has $C_2$ or pseudo-$C_2$ symmetry for isospecificity or $C_s$ or pseudo-$C_s$ symmetry for syndiospecificity.

Catalysts or their precursor metallocenes in accordance with the present invention may be characterized by formula (I):

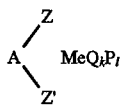

where: A is a structural bridge; Z and Z' are the same or different α and β substituted cyclopentadienyl radicals where the β substituents stereodirect and the α substituents stereolock an orientation of a growing polymer chain end which results in a tactiospecific monomer addition; Me is a Group 3, 4, or 5 metal or La, Lu, Nd or Sin, from the Periodic Table of Elements; Q is a hydrocarbyl radical or a halogen atom; P is a stable non-coordinating anion; k is an integer having a value from 1 to 3; and l is an integer having a value from 0 to 2.

Isospecific catalysts or catalyst precursors of formula (I) are characterized by having at least one substituted cyclopentadienyl radical having either a 2,4 or 3,5 substitution pattern and the other substituted cyclopentadienyl radical either having an identical or different 2,4 or 3,5 substitution pattern such that the resulting catalyst precursor has either $C_2$ or pseudo-$C_2$ symmetry and such that the the β substituents stereodirect and the α substituents stereolock the orientation of the growing polymer chain end which results in a π face selective, isospecific monomer addition.

Syndiospecific catalysts or catalyst precursors of formula (I) are characterized by having at least one substituted cyclopentadienyl radical having either a 3,4 or 2,5 substitution pattern and the other cyclopentadienyl ring having either a 2,5 or 3,4 substitution pattern, respectively, or bilateral or pseudo-bilateral symmetry (i.e., being symmetric with respect to a bisecting mirror plane containing the ring atom bonding to the bridging group A) and such that the resulting catalyst precursor has either $C_s$ or pseudo-$C_s$ symmetry and such that the the β substituents stereodirect and the α substituents stereolock the orientation of the growing polymer chain end which results in a π face selective, syndiospecific addition The present invention further provides a process for producing isotactic and syndiotactic polyolefins comprising introducing at least one of the catalyst components of formula (I) into a polymerization reaction zone containing an ethylenically unsaturated monomer. In addition, a co-catalyst such as an alkyl aluminum or a aluminoxane is added into the reaction zone or combined with the metallocenes of formula (I) prior to introduction into the zone. For cationic catalysts of formula (I) (l=1 or 2), an ion pair is reacted with the neutral metallocene (l=0) to form a cationic metallocene either prior to or concurrent with introduction in the zone.

Furthermore, the catalyst components of formula (I) can be prepolymerized prior to introduction into the reaction zone and/or prior to the stabilization of the reaction conditions in the zone. Moreover, the present invention can also be practiced to produce intimate blends of isotactic and syndiotactic polymers by introducing a catalyst of formula (I) designed for each tacticity into the reaction zone. The preferred application of the invention is in the production of isotactic polypropylene, syndiotactic polypropylene or mixtures thereof.

The present invention also includes processes for preparing the β stereodirected, α stereolocked metallocene ligand systems, methods for preparing the catalysts of formula (I) and methods for activating the catalysts of formula (I) into catalytically active polymerization agents.

DETAILED DESCRIPTION

The inventor has found that catalysts can be prepared which have improved stereospecificity in the preparation of isotactic and syndiotactic polyolefins relative to prior art analogs. These uniquely designed catalysts have as a key feature a stereorigid, bridged substituted cyclopentadienyl ligand system that simultaneously stereodirects and stereolocks the growing chain end attached to the metallocene catalysts in a specific conformation where the degree of stereoselectivity can be controlled to yield isotactic and syndiotactic polymers with essentially no defects compared to prior art catalyst systems.

The α and β substituents on each Cp ring are strategically situated and sized to direct and lock the growing polymer chain end into a specific conformation that results in tactiospecific monomer addition and in the formation of polymers with enhanced and/or tailored stereospecificity, higher or variable melting points, and higher or variable crystallinity over prior art polymers. The catalyst are designed wherein conformational directing and locking is achieved by having non-hydrogen α and β Cp substituents (distal and proximal substituents relative to the ring carbon bonded to the structural bridging group A) that act in concert to direct and lock the growing polymer chain end into an orientation that results in the formation of either iso or syndio specific monomer addition and such that the overall ligand has either $C_2$ or pseudo-$C_2$ or $C_s$ or pseudo-$C_s$ symmetry depending on whether the catalyst is isospecific or syndiospecific, respectively. The steric bulk of the substituents must be sufficient to direct and lock both the growing polymer chain end into a specific orientation and, hence, to define the approach and coordination of a monomer unit so that an essentially pure stereoregular polymer can be produced.

Polymers with enhanced stereoregularity are characterized by having high melting points and high cystallinity, thus making them more useful as a high temperature plastic for making structural plastic components for a wide variety of uses such as microwave cooking surfaces and the like.

The inventor has also found that by controlling the $\alpha$ and $\beta$ substituents relative steric size, catalysts can be formed that insert statistically controllable defects into the resulting polymers. The inventor has also found that catalysts of the present invention can be designed to produce hemi-isotactic polymers with little or no defects in the isotactic part. The inventor has also found that intimate mixtures of essentially pure isotactic and/or syndiotactic polymers with less stereoregular polymers can be prepared by polymerizing monomer in the presence of the tactiospecific catalysts of the present invention in combination with less tactiospecific catalysts of the present invention and/or prior art catalysts.

The present invention involves the use of certain $\beta$ stereodirected and $\alpha$ stereolocked, stereorigid metallocenes as catalysts or catalyst precursors for preparing isospecific polyolefins, syndiospecific polyolefins or intimate mixtures thereof. Of course, one skilled in the art should recognize that the metallocenes catalysts of formula (I) actually represent precursors to the actual catalytically active species that ultimately polymerizes the olefinic monomers. Typically, the metallocene catalysts of formula (I) can be combined with co-catalysts to provide a more practical catalytically active agent.

The term metallocene, in accordance with normal art usage, denotes an organometallic coordination compound in which two cyclopentadienyl containing ligands are bonded to or "sandwiched" about a central metal atom. The metal atom may be a transition metal or transition metal halide, alkyl, alkoxy, halide or the like. Such structures are sometimes referred to as "molecular sandwiches" because the two cyclopentadienyl ligands are oriented above and below the plane containing the coordinated metal atom (Me in formula (I)). Similarly, the term "cationic metallocene" means a metallocene which carries a positive charge, i.e., the metallocene complex is a cation associated with a stable non-coordinating or pseudo-non-coordinating anion.

The metallocenes used in the present invention are $\beta$ stereorigid, $\alpha$ stereodirected, and stereolocked such that the conformation of the growing polymer chain end is locked in such a way that the tacticily of the resulting polymer is specifically contolled. Stereorigidity is imparted to the metallocene ligand by a chemical bridge connecting the Cp rings. The bridging group prevents the Cp rings from rotating and undergoing fluctuational changes leading to isomerizations. Stereodirecting and stereolocking are effectuated by placing appropriate $\alpha$ and $\beta$ substituents on the two Cp rings that force the polymer chain end to occupy a sterically preferred orientation relative to the coordinating metal Me and the substituents on the Cp rings and the non-Cp ligand x-y plane. Of course, it should be recognized that the stereodirecting and stereolocking substituents interact primary with the carbon center one carbon removed from the carbon coordinated to the metal Me.

In the case of isospecific catalysts or catalyst precursors, each Cp ring will bear a stereodirecting and a stereolocking substituent. The stereodirecting group occupies a $\beta$ site on the Cp rings while the stereolocking group occupies a non-adjacent $\alpha$ site on the same Cp rings, i.e., the Cp rings will have either a 2,4 or 3,5 substitution pattern, and such that the catalysts or catalyst precursors have with either $C_2$ or pseudo-$C_2$ symmetry. One preferred class of isospecific catalysts or catalyst precursors of formula (I) have identical 2,4 or 3,5 disubstituted Cp rings where the $\alpha$ substituents are sterically larger than a methyl group and where the metal Me in formula(I) is Zr. Another preferred class of isospecific catalysts or catalyst precursors of formula (I) will have one Cp ring with either a 2,4 or 3,5 substitution pattern and the other Cp containing group will be symmetric or pseudo-symmetric with respect to a bisecting mirror plane containing the bridgehead ring carbon (the ring carbon bonded to the A group), e.g., dimethylsilenyl[3-t-butyl-5-methyl-CpFlu]ZrCl$_2$ where Flu stands for the fluorenyl ring system.

In the case of syndiospecific catalysts or catalyst precursors, the conformational locking groups are situated such that the $\alpha$ and $\beta$ substituents are not on the same Cp ring, i.e., one Cp ring has two $\alpha$ substituents (2,5 substitution pattern) while the other Cp ring has two $\beta$ substituents (3,4 substitution pattern). A preferred class of syndiospecific catalyst of formula (I) has one Cp ring has either a 2,5 or 3,4 substitution pattern and the other ring has bilateral or pseudo-bilateral symmetry, e.g., dimethylsilenyl[2,5-dimethyl-CpFlu]ZrCl$_2$.

In contrast to the prior art, the metallocene catalysts of the present invention must not only be stereorigid, but must be stereodirecting and stereolocking due to the presence of $\alpha$ and $\beta$ substituents attached to the Cp rings such that the substituents both direct and lock the growing polymer chain end into a preferred orientation or conformation such that the resulting structure after monomer coordination can undergo only a stereospecific chain extention reaction or monomer addition/insertion reaction mediated by the transition metallic center.

The stereorigid, stereodirected, stereolocked metallocene catalysts and catalyst precursors employed in the present invention may be characterized by formula (I):

where A, Z, Z', Me, Q, P, k and l are as previously defined.

Of course, one skilled in the art should also recognize that the permissible values for k and l will depend on the actual ligand system and on the coordinating metal and the values of k and l are understood to conform to known organometallic structural and electronic requirements.

Suitable structural bridging groups A that impart stereorigidity to the metallocene catalysts of formula (I) include, without limitation, a C1–C20 alkenyl radical, such as a peralkylated C1–C20 alkenyl radical, a dialkyl methylene radical, a C3–C12 cyclohydrocarbyl radical, an aryl radical, a diarylmethylene radical, a diaryl allenyl radical, a silicon hydrocarbyl radical, dihydrocarbyl silenyl radicals, a germanium hydrocarbyl radical, a phosphorus hydrocarbyl radical, a nitrogen hydrocarbyl radical, a boron hydrocarbyl radical, an aluminum hydrocarbyl radical, and the like.

Other suitable bridging groups include ionic units such as $B(C_6F_5)_2$, and $Al(C_6F_5)_2$, and the like and $R_2C$, $R_2Si$, $R_4Et$, $R_6Pr$, and the like where R can be any hydrocarbon, cyclic hydrocarbon, cyclic or linear hydrocarbons bearing another organometallic catalyst or carboranes, etc. Indeed, the bridges can be $C_2$ bridges (and $C_3$ etc.) which form the backbone of polymeric supports (e.g. the atactic, syndiotactic and isotactic polymers from vinyl cyclopentadienes, vinyl-indenes, vinyl-fluorenes, etc. and copolymers thereof) as well as functionalized polystyrene precursors and all other polymers with terminal or branched boron or Al functional groups which are bonded to the catalysts, e.g., in zwitterionic form. $R_2C$ and $R_2Si$ bridging groups are preferred with isopropylidene and dimethylsilenyl bridging groups being particularly preferred.

Suitable Z and Z' radicals include 2,4 or 3,5 disubstituted Cp radicals, 2,5-disubstituted Cp radicals, 2,3,4,5-tetrasubstituted Cp radicals, 2,3-disubstituted-1-indenyl radicals, 2,3-disubstituted-4,5,6,7-tetrahydro-1-indenyl radicals, the 9-fluorenyl radical, 5-substituted-9-fluorenyl radicals, 4,5-disubstituted-9-fluorenyl radicals, and condensed aromatic anologs thereof, and the like. Of course, the exact choice of Z and Z' will depend the exact catalyst being prepared as evidenced herein. It should also be evidence that the standard organic numbering system for aromatic and condensed aromatic rings is being used as described in the Handbook of Chemistry and Physics, ed. 57, CRC Press Inc. 1976.

Suitable $\alpha$ and $\beta$ substituents include, without limitation, a hydrogen atom, a linear or branched C1–C20 hydrocarbyl radical, a linear or branched C1–C20 halocarbyl radical, a C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorus hydrocarbyl radical, a nitrogen hydrocarbyl radical, a boron hydrocarbyl radical, an aluminum hydrocarbyl radical, a Cl atom, a Br atom, an I atom, and the like. Preferred radicals include a hydrogen atom, linear or branched C1–C20 alkyl radicals with methyl, ethyl, isopropyl, and t-butyl radicals being particularly preferred. Larger radicals such as $Si(Ph_3)_3$ may be used, but these larger radicals may reduce the practical utility of the catalysts. Of course, the substituents can be such that extended poly-condensed aromatic systems are formed such as naphthylene, benzoindene, anthracene, phenanthracene, and the like. Other exemplary hydrocarbyl radicals include methyl, ethyl, propyl, isopropyl, butyl, isobutyl, amyl, isoamyl, hexyl, heptyl, octyl, nonyl, decyl, cetyl, phenyl, and the like.

Zwitterionic radicals such as $Cp-B(C_6F_5)_3^-$, $Cp-Al(C_6F_5)_3^-$, $Cp-Al(CF_3)_3^-$, $Cp-B(C_6H_5)_3^-$, $Cp-X-Al(C_6F_5)_3^-$, $Cp-X-B(C_6F_5)_3^-$, and the like are also suitable radicals, where X can represent an alkenyl group, alkenoxy group or the like. Metallocenes of formula (I) containing zwitterionic radicals on either the Z or Z' rings and incorporating a group 4 metal for Me would not need an independent and sometimes stereochemically interfering counterion (i.e., l=0). These zwitterionic radicals may also be suitable for mono and di cations of catalysts of formula (I) where Me is a group 5 metal in the plus five oxidation state (Me(V)). They could even conceivably be used to create ion-pair catalysts with the normally neutral group 3 metals in the plus three oxidation state (Me(III)). In this case, one could obtain heterogeneous insoluble ion-pair systems for improved polymer particle size control.

Suitable metals corresponding to Me include, without limitation, Group 3, 4 or 5 metals or La, Lu, Nd and Sm, from the Periodic Table of Elements. Preferably, Me is a Group 4 or 5 metal and more preferably a Group 4 metal, and specifically titanium, zirconium or hafnium.

Suitable hydrocarbyl radical or halogen corresponding to Q include, without limitation, a linear or branched C1–C20 alkyl radical, a C1–C20 alkoxide, an aryl radical, an alkylaryl radical, an arylalkyl radical, or a halogen atom. Preferably, Q is a linear or branched C1–C12 alkyl radical or a Cl atom or a mixture thereof.

Suitable non-coordinating anions corresponding to P in formula (I) include, without limitation, $[BF_4]^-$, $B(PhF_5)^-_4$, $[W(PhF_5)_6]'$, $[Mo(PhF_5)_6]^-$ (wherein $PhF_n$ is pentafluorophenyl), and $[AlR_4]^-$ (wherein each R is independently, Cl, a C1–C5 alkyl group preferably a methyl group, an aryl group, e.g. a phenyl or substituted phenyl group, or a fluorinated aryl and alkyl group). For a further description of compatible non-coordinating anions and their associated cations which may be employed in the present invention, reference is made to European applications 277, 003 and 277,004 incorporated herein by reference.

Q is a previously defined, but preferably, Q is a methyl or halogen atom, and more particularly a chlorine atom.

The exact nature of Z and Z' are substituted in such that the resulting metallocene will have either $C_2$ or pseudo-$C_2$ or $C_s$ or pseudo-$C_s$ symmetry. Thus, isospecific catalysts and/or catalyst precursors will result from ligands characterized by having at least one substituted cyclopentadienyl radical with either a 2,4 or 3,5 substitution pattern and such that the resulting catalyst precursor has either $C_2$ or pseudo-$C_2$ symmetry and such that the $\beta$ substituents stereodirect and the $\alpha$ substituents stereolock the growing polymer chain end into a preferred conformation during chain extention and define $\pi$ face selectivity for the incoming monomer resulting in isospecific monomer addition.

While, syndiospecific catalysts and/or catalysts precursor will result from ligands characterized by having at least one substituted cyclopentadienyl radical with either a 3,4 or 2,5 substitution pattern and such that the resulting catalyst precursor has either $C_s$ or pseudo-$C_s$ symmetry and such that the $\beta$ substituents stereodirect and the $\alpha$ substituents stereolock the growing polymer chain end into a preferred conformation during chain extention and define $\pi$ face selectivity for the incoming monomer resulting in syndiospecific addition.

A few exemplified examples of metallocene ligands (AZZ'), that generate catalyst with high isotactic selectivity include, without limitation, methylene(3-t-butyl-5-methyl-cyclopentadienyl) (fluorenyl), isopropylidene(3-t-butyl-5-methyl-cyclopentadienyl)(fluorenyl), dimethylsilenyl(3-t-butyl-5-methyl-cyclopentadienyl)(fluorenyl), methylene(2,4-di-t-butyl-cyclopentadienyl)(fluorenyl), isopropylidene(2,4-di-t-butyl-cyclopentadienyl) (fluorenyl), dimethylsilenyl(2,4-di-t-butyl-cyclopentadienyl)(fluorenyl), methylene(2-trimethylsilyl-4-t-butyl-cyclopentadienyl)(fluorenyl), isopropylidene(2-trimethylsilyl-4-t-butyl-cyclopentadienyl)(fhorenyl), dimethylsilenyl (2-trimethylsilyl-4-t-butyl-cyclopentadienyl) (fluorenyl), and the like.

A few exemplified examples of metallocene ligands (AZZ'), that generate catalyst with high syndiotactic selectivity include, without limitation, methylene(3,4-di-t-butyl-cyclopentadienyl)(fluorenyl), isopropylidene(3,4-di-t-butyl-cyclopentadienyl) (fluorenyl), dimethylsilenyl(3,4-di-t-butyl-cyclopentadienyl)(fluorenyl), methylene(3,4-di-t-butyl-cyclopentadienyl)(2,5-dimethyl-cyclopentadienyl), isopropylidene(3,4-di-t-butyl-cyclopentadienyl) (2,5-dimethyl-cyclopentadienyl), dimethylsilenyl(3,4-di-tobutyl-cyclopentadienyl)(2,5-dimethyl-cyclopentadienyl), and the like.

A few exemplified examples of metallocene ligands (AZZ'), that generate catalysts with varying, but controllable degrees of hemi-isotactic selectivity, include, without limitation, methylene (3-t-butyl-4-methyl-cyclopentadienyl)(fluorenyl), ethylene (3-t-butyl-4-methyl-cyclopentadienyl)(fluorenyl), isopropylidene (3-t-butyl-4-methyl-cyclopentadienyl)(fluorenyl), dimethylsilenyl (3-t-butyl-4-methyl-cyclopentadienyl)(fluorenyl), and the like.

The unique and novel feature of the catalysts of the present invention are that the catalysts are stereorigid and stereodirect and lock the polymer chain end such that tactiospecific monomer addition can occur. These characteristics can cause the polymers generated using these catalysts to have near 100% stereoregularity. The catalyst can be designed by controlling the α and β substituents to virtually eliminate the insertion of the wrong π face selectivity of monomer during chain propagation. Thus, the bridging group A imparts the stereorigidity to the catalysts of formula (I), while in concert the β-substituents stereodirect and α-substituents stereolock the chain end attached to the catalysts and/or catalyst precursors of formula (I) and thereby defines the stereochemistry of addition of each successive monomer unit to the growing chain.

It is reasonably supposed from the prior art that the relative stereospecificities, though higher or statistically controllable than previously available with other metallocene analogs, can be tailored with a number of strategies. The single carbon bridged versions have been found to be more stereospecific than the silicon bridged analogs for syndiotactic specific catalysts; while the carbon bridged versions have always been less stereospecific than the silicon bridged analogs for isospecific catalysts. It is expected that the larger the steric requirements are for the stereodirecting and stereolocking α and β substituents, usually, the more stereospecific the catalyst will be. The difference in the steric requirements for the conformational directing and/or locking α and β substituents can be used to optimize the orientation of the chain end.

The present invention is directed to both neutral metallocene and cationic metallocene catalysts and catalyst precursors as evidenced by the subscript 1 associated with the anion P having permissible values of 0 to 2, i.e., when l=0, the catalysts are neutral and when l=1 or 2 the catalysts are cationic as evidenced by the inclusion of the anion P in formula (I).

The catalysts of the present invention are either isospecific or syndiospecific and produce polymers with very high or statistically controlable tacticity indices depending on the desired tacticity. In order to produce the tactically specific catalysts and/or catalyst precursors of the present invention, the characteristics of the α and β substituents on the bridged cyclopentadienyl rings are important. Thus, the "steric requirement" or "steric size" of the α and β substituents are designed to control the steric characteristics of catalysts or catalyst precursors such that the overall ligand system has $C_2$ or pseudo-$C_2$ or $C_s$ or pseudo-$C_s$ symmetry and such that one Cp radical is either 2,4 disubstituted, 3,5 disubstituted, 2,5 disubstituted, or 3,4 disubstituted and where the other Cp ring is symmetric or pseudo-symmetric with respect to a mirror plane bisecting the Cp ring and passing through the bridgehead ring carbon (the ring carbon bonded to the A group of formula (I)).

This very specific arrangement of the α and β substituents allows these unique catalysts to define the conformation of the growing polymer chain end and π face selectivity of each successive monomer unit such that the stereochemistry of the monomer addition is statistically controllable stereospecific. The steric difference and the overall symmetry of the ligand system acts to block the approaching monomer from a random approach and control the subsequent addition and catalyst isomerization such that the monomer is added to the growing polymer chain in a tactically specific manner.

Preferably, the syndiospecific metallocene catalysts of the present invention exhibit overall $C_s$ or pseudo-$C_s$ symmetry of the metallocene catalysts relative to a plane bisecting the bridged cyclopentadienyl rings while the isospecific metallocene catalysts of the present invention exhibit overall $C_2$ or pseudo-$C_2$ symmetry.

The term $C_s$ or pseudo-$C_s$ symmetry means that the two α-substituents on one Cp ring are either the same or different and the two β-substituents on the other Cp ring are either the same of different. When both α-substituents and both β-substituents are the same, the catalysts or catalyst precursors have $C_s$ symmetry. When either or both of the α-substituents or β-substituents are different the catalysts or catalyst precursors have pseudo-$C_s$ symmetry. Analogously, the term $C_2$ or pseudo-$C_2$ symmetry means that each Cp ring has sterically either the same or different α and β substituents.

For example, the dimethylsilenylbis(3-t-butyl-5-methyl-Cp)ZrCl$_2$ catalyst or catalyst precursor would be isospecific catalyst with $C_2$ symmetry, while the dimethylsilenyl(3-t-butyl-5-methyl-Cp)(fluorenyl)ZrCl$_2$ catalyst or catalyst precursor would be isospecific catalyst with pseudo-$C_2$ symmetry. Analogously, dimethylsilenyl(3,4-di-t-butyl-Cp)(2,5-dimethyl-Cp)ZrCl$_2$ catalyst or catalyst precursor would be syndiospecific catalyst with $C_s$ symmetry, while the dimethylsilenyl(3-t-butyl-5-isopropyl-Cp)(2,5-dimethyl-Cp)ZrCl$_2$ catalyst or catalyst precursor would be syndiospecific catalyst with pseudo-$C_s$ symmetry.

One preferred subclass of the isospecific catalysts of formula (I) are catalysts of formula (II) as shown below:

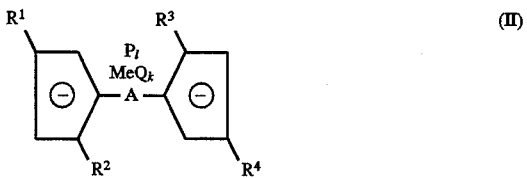

(II)

where A, Me, Q, P, l and k are as previously defined and $R^1$ and $R^4$ are the same or different radicals as described above for the substituents attached to Z and Z' and where $R^2$ and $R^3$ are the same or different radicals as described for $R^1$ and $R^4$ and $R^1$ and $R^4$ are preferably sterically larger than a methyl group. However, a preferred sub-class of catalysts and catalyst precursors of formula (II) are obtained where $R^1$ and $R^4$ are the same or different trialkylsilyl radicals and where $R^2$ and $R^3$ are the same or different alkyl radicals and especially where $R^1$ and $R^4$ are trimethylsilyl radicals and where $R^2$ and $R^3$ are methyl radicals. Again the unique attribute of the catalysts of formula (II) is the presence of α and β substituents of the Cp rings which direct and lock the tactiospecificity of the toohomer addition reaction.

Another, preferred subclass of the isospecific catalysts of formula (I) are catalysts of formula (III) as shown below:

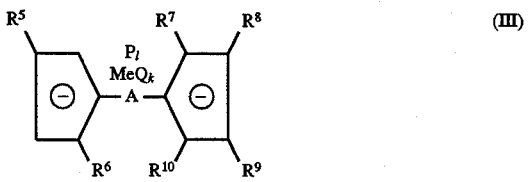

(III)

where A, Me, Q, P, k, and l are as previously defined and $R^5$ and $R^6$ are the same or different radicals as described above for the substituents attached to Z and Z' and where $R^7$ and $R^8$ and $R^9$ and $R^{10}$ are the same or different radicals as described for $R^1$ and $R^2$ and where these pairs of substituents can be joined together into saturated, unsaturated or aromatic fused rings.

Still another, preferred subclass of the isospecific catalysts of formula (I) are catalysts of formula (IV) as shown below:

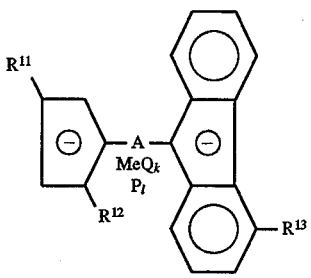

(IV)

where A, Me, Q, P, k, l, are as previously defined and $R^{11}$ and $R^{12}$ are the same or different radicals as described above for the substituents attached to Z and Z' and where $R^{13}$ is a radicals as described for $R^{11}$ and $R^{12}$, but including hydrogen.

Still another, preferred subclass of the syndiospecific catalysts of formula (I) are catalysts of formula (V) as shown below:

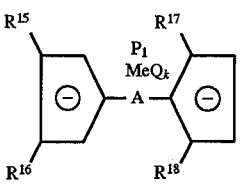

(V)

where A, Me, Q, P, k, l, are as previously defined and $R^{15}$ and $R^{16}$ the same or different radicals as described above for the substituents attached to Z and Z' and where $R^{17}$ and $R^{18}$ are the same or different radicals as described for $R^{15}$ and $R^{16}$.

Still another, preferred subclass of the catalysts of formula (I) are catalysts of formula (VI) as shown below:

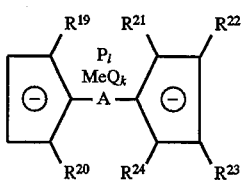

(VI)

where A, Me, Q, P, k, l, are as previously defined and $R^{19}$ and $R^{20}$ are the same or different radicals as described above for the substituents attached to Z and Z' and where $R^{21}$ and $R^{22}$ and $R^{23}$ and $R^{24}$ are the same or different radicals as described for $R^{19}$ and $R^{20}$, but including hydrogen, and and where these pairs of substituents can be joined together into saturated, unsaturated or aromatic fused rings.

Still another, preferred subclass of the catalysts of formula (I) are catalysts of formula (VII) as shown below:

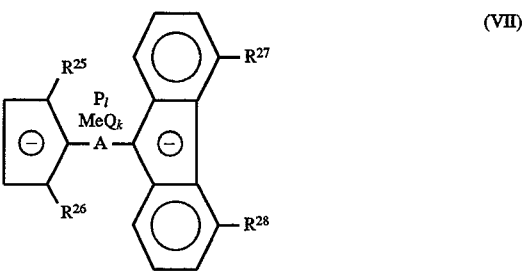

(VII)

where A, Me, Q, P, k, l, are as previously defined and $R^{25}$ and $R^{26}$ are the same or different radicals as described above for the substituents attached to Z and Z' and where $R^{27}$ and $R^{28}$ are the same or different radicals as described for $R^{25}$ and $R^{26}$, but including hydrogen.

One of ordinary skill in the art should recognize that the overall symmetry or pseudo symmetry of the catalysts of formulas (I–VII) controls the tacticity of the resulting polymer. Catalysts with $C_2$ or pseudo-$C_2$ symmetry give rise to isospecific polyolefins, while syndiospecific catalysts are represented by catalysts having either $C_s$ or pseudo-$C_s$ symmetry.

Again all the catalyst of formulas (I–VI) share the same attributes, each is required to have α and β substituents such that stereodirect and stereolock the chain end conformation as described previously.

The catalysts and catalyst precursors of the present invention can be tailored to a desired tactiospecificity by controlling the steric requirements of the α and β substituents on the Cp rings. The concept of substituents with different steric requirements, size or bulk is well known in the art. However, to ensure that ordinary artisans understand its usage in the context of this invention, the following non-exhaustive and illustrative list shows the relative steric bulk of a variety of substituents:

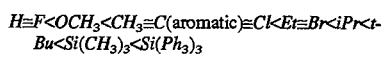

$H \equiv F < OCH_3 < CH_3 \equiv C(\text{aromatic}) \equiv Cl < Et \equiv Br < iPr < t\text{-}Bu < Si(CH_3)_3 < Si(Ph_3)_3$ Of course, cationic metallocene catalysts and catalyst precursors require the anion P to maintain net neutrality. The anion indicated by P in formula (I) is preferentially a compatible non-coordinating artion that either does not coordinate with the metallocene cation or is only weakly coordinated to the cation to remain sufficiently labile so that it can be readily displaced by a neutral Lewis base such as a monomer unit.

In addition to size, it is also thought that other characteristics are important for good anionic counterions. Such characteristics include stability and bonding. The anion must be sufficiently stable so that it cannot be rendered neutral by virtue of the metallocene cation reacting with it. The bond strength with the cation is, such that it can make way for the inserting monomer in the chain growing reaction.

A preferred procedure for producing cationic metallocene catalyst of the present invention (l=1 or 2) involves the reaction of an anionic compound in a non-coordinating solvent with a stereorigid, β stereodirected, α stereolocked metallocene of formula (I) minus P. Thus, triphenylcarbeniumtetrakis(pentafluorophenyl)boronate may be reacted with a neutral metallocene of the present invention in a solvent such as toluene to generate a cationic metallocene of the present invention. This preparation method was disclosed in U.S. Pat. No. 5,225,500, the entire disclosure of which is incorporated by reference.

Without intending to limit the scope of the present invention, it is known that in the case of syndiospecific polymerization the catalysts isomerize with each monomer addition to the polymer chain as the chain migrates between catalyst coordination sites. The overall $C_s$ or pseudo-$C_s$ symmetry of the figand system results in the alternating steric configurations of syndiotactic polymers. This stereospecific control may be contrasted to the chain-end control of the catalysts disclosed by Natta et al.

A preferred application of the present invention is in the polymerization of C3+ alpha olefins, specifically propylene, into isotactic, syndiotactic, hemi-isotactic polymers or mixtures thereof. However, the invention may be employed in the preparation of hemi-isotactic, isotactic or syndiotactic polymers derived from other ethylenically unsaturated monomers. For example, syndiospecific, isospecific or hemi-isotactic specific propagation of a polymer chain from 1-butene may be carried out in accordance with the invention.

Ethylenically unsaturated monomers suitable for use in this invention include, without limitation, any organic molecule having a terminal vinyl group ($CH_2=CH-$) such as: α-olefins including propylene, 1 obutene, 1-pentene, 1-hexene, 4-methyl-1-pentene and the like; vinyl halides including vinyl fluoride, vinyl chloride, and the like; vinyl arenes including styrene, alkylated styrenes, halogenated styrenes, haloalkylated styrenes and the like; dienes such as 1,3-butadiene and isoprene (i.e., 1,2 -addition). Polypropylene is probably of the greatest practical significance and the invention will be described in detail with reference to the production of propylene polymers of different tacticities. However, other polymers having a desired tacticily are also of interest.

The polymerization procedures disclosed in U.S. Pat. No. 4,892,851, may be also employed in carrying out the methods of the present invention and is incorporated herein by reference. Co-catalysts, usually organo-aluminum compounds such as trialkylaluminum, trialkyloxyaluminum, dialkylaluminum halides or alkylaluminum dihalides may be employed in the present invention. Especially suitable alkylaluminums are trimethylaluminum and triethylaluminum with the latter, commonly referred to as TEAL, being most preferred. Methylaluminoxane (MAO) are also usable in carrying out the methods of the present invention especially for neutral metallocene catalyst precursors. MAO may be used as a co-catalyst with metallocene catalysts in amounts well in excess of the stoichiometric equivalent amount providing mole ratios of aluminum to the coordinating metal (Me) of about 100–1000.

While the applicant's invention is not to be restricted by theory, it is believed that neutral metallocenes of certain metals are converted to the active cationic complexes by reaction with the MAO in the manner as disclosed by Zambelli, A. et at., "Isotactic Polymerization of Propene: Homogenous Catalysts Based on Group 4 Metallocenes Without Methylaluminoxane", Macromolecules 1989, 22, pages 2186–2189.

The catalyst precursors used in the present invention may be prepared by procedures similar to those disclosed in U.S. Pat. No. 4,892,851, while the active cationic catalysts may be produced by simply converting the neutral metMiocene into the cationic state following procedures such as those disclosed in European applications 277,003 and 277,004 or more preferably, by reaction with triphenylcarbenium boronales. Similarly, alcohol—$B(PhF_5)_3$ complexes can be used as anionic precursors for forming the active cationic metallocenes of the present invention where the alcoholic proton reacts with an alkyl group on the coordinating metal atoms to generate a cationic metallocene and a alkoxide—$B(PhF_5)_3$ anion.

The chain-end conformational locking catalysts of formula (I) can also be converted to supported heterogeneous catalysts by depositing the catalysts on supports including, without limitation, silica, alumina, magnesium dichloride, polystyrene beads, and like. The supported analogs of the present catalyst can improve the bulk density of the polymer as further described in Canadian Pat. No. 2,027,145, U.S. Pat. Nos. 4,935,474 and 4,530,914 and European Appln. Nos. 0,427,697 and 0,426,638, incorporated herein by reference.

The catalyst can also be chemically linked to the support by placing functional groups with ion pairs or Lewis acid centers or Lewis base centers on the ligands and/or supports. Supporting can also be achieved by using large (oligomeric or polymeric) insoluble anions as counter ions.

The catalysts of the present invention can be used to prepare isospecific, syndiospecific, hemi-isospecific, and aspecific polymerizations, not only of propylene, but for all α-olefins such as 1-butene, 1-pentene, 1-hexene, 4-methyl-1-pentene, $CH_2=CH(CH_2)_pSi(CH_3)_3$ where p is practical integer, and the like.

One of ordinary skill should recognize that some of the ligands of the present invention may give rise to meso and rac catalysts. The stereospecific rac catalysts can be separated from the meso forms by fractional crystallization, solvent extraction, or chromatography.

The catalysts of the present invention can obviously be used in conjunction with each other, all other metallocene catalysts, $TiCl_3$/DEAC, and or $TiCl_4$/$MgCl_2$/TEAL catalysts having internal electron donors such as diisobutylypthalate and external donors such as diphenyldimethoxysllane, methanol, etc. to produce polymers with mixed stereochemical composition, distributions and tailored molecular weight distributions. Reactor blends of polymers with optimized physical, thermal, mechanical, and rheological properties can be tailored to produce the optimum mixture for specific applications requiring high melt strength, high clarity, high impact strength, and high rates of crystallization, simply by mixing catalyst species together in appropriate ratios.

The catalysts of the present invention clearly have the potential to influence the rate of termination by β-hydride elimination reactions. This, therefore, provides a novel ligand effect for controlling polymer molecular weights. These catalysts can be exploited by used to tailor molecular weights and hence molecular weight distributions with mixed species of the catalysts and any other class of catalysts. This would be advantageous in tailoring the polymer properties in HDPE, LLDPE, i-PP, s-PP, etc. Similarly the chain-end conformation locking substituent will influence the rate of reactivity of the new metallocenes with α-olefins such as propylene, butene and hexene. The new ligand effects on the catalyst reactivity ratios can be exploited to produce reactor blends with varying composition, sequence and molecular weight distributions. Similarly, the catalysts can be reasonably be expected to provide improved tailored grades of polypropylene and propylene-ethylene high impact copolymers as reactor blends, random ethylene-propylene copolymers and terpolymers of ethylene, propylene and other monomers, or from reactors in series including fluidized and stirred gas phase polymerizations.

The catalysts of the present invention can also be used to generate copolymers of olefins and copolymers of olefins and dienes with varying degrees of tactiospecificity and 1,2 diene insertion.

The generalized methods that follow described the preparation of the catalyst and/or catalyst precursors. It is important that the catalyst complex be pure as usually low molecular weight, amorphous polymer can be produced by impure catalysts.

Generally, the preparation of the metallocene complex consists of forming and isolating the bridged bis Cp containing ring ligands which are then (aromatized and) reacted with a halogenated metal to form the complex.

The synthetic procedures are generally performed under an inert gas atmosphere using a glove box or Schlenk techniques. The synthesis process generally comprises the steps of preparing dianionic ligand and coordinating the dianionic ligand with a metal Me and purifying the coordinating metal-ligand system.

The synthesis of the ligands of the present invention can be accomplished by contacting an appropriately substituted fulvene with an appropriately substituted cyclopentadienyl containing anion under reaction conditions sufficient to produce a bridged structure having the requisite substituted Cp containing rings to yield ligands that will ultimately be used to prepare the unique catalyst of formulas (I-VI).

Fulvene is cyclopentadiene with an exo-cyclic methylene carbon at the 1 position of cyclopentadiene ring. The exo-cyclic methylene carbon is defined as the 6 position of fulvene. Since this carbon can ultimately become the bridging group A in formula (I), the preferred fulvenes for the preparation of the present catalysts are typically 6,6-disubstituted fulvenes so that the resulting bridging group is a tertiary carbon. The fulvenes useful in preparing the ligands of the present invention are generally 6,6 disubstituted.

As noted previously, a preferred mode of converting the neutral metallocenes to cationic metallocene catalyst useful in the present invention involves reaction of the neutral metallocenes with a triphenylcarbenium boronate. A preferred reactant is triphenylcarbeniumtetrakis(pentafluorophenyl)boronate.

The catalysts of the present invention can also be made into efficient pre-polymerized catalysts by the methods disclosed in U.S. Pat. Nos. 3,893,989, 4,287,328, 4,316,966 and U.S. Pat. No. 5,122,583 incorporated herein by reference. Essentially, the catalysts are used to polymerize monomer on a small scale. The pre-polymerized catalysts can be prepared in the presence of co-catalysts such as the ones described previously.

The pre-polymerized catalysts can then be introduced into a reaction zone containing monomer. The resulting polymerization can show greatly improved catalytic efficiencies. The preferred methods for using prepolymerized catalysts of the present invention are: (1) contacting a prepolymerized catalyst of formula (I) with a co-catalyst and introducing the catalyst into a polymerization reaction zone containing monomer and (2) contacting a pre-polymerized catalyst of formula (I) with a co-catalyst and introducing the catalyst into a polymerization reaction zone containing monomer. Of course, the pre-polymerized catalysts of formula (I) can be introduced into the reaction zone in a stream either separately or in conjunction with separate streams containing the co-catalyst and/or electron donors.

Preferred pre-polymerized catalysts of the present invention have a weight ratio of polymer/catalyst of approximately 0.1–100 with ratios of less than 10 being particularly preferred.

The syntheses are conveniently done at room temperature or lower in low boiling solvents which are readily evaporated in vacuo.

A general scheme of preparing the catalyst of formula (I) is out lined below for the synthesis of $Me_2Si(3$-t-butyl-$5$-methyl)(fluorenyl)$ZrCl_2$ as a catalyst precursor.

3-methyl-6,6-dimethylfulvene is prepared from the methyl cyclopentadienyl anion and acetone; as shown by Little et al in the Journal of Organic Chemistry. Reaction of 3-methyl-6,6-dimethylfulvene with one equivalent of methyl lithium in THF results in the Li salt of the 1-t-butyl-3-methyl-cyclopentadienyl anion. Separately, 0.5 equivalents of $Me_2SiCl_2$ in pentane at $-78°$ C. to $22°$ C. is reacted with the fluorenyl anion, followed by overnight stirring, results in $ClMe_2Si$(fluorenyl). The $ClMe_2Si$(fluorenyl) is then added to the 1-t-butyl-3-methyl-cyclopentadienyl anion resulting in the formation of $Me_2Si(3$-t-butyl-$5$-methyl-cyclopentadienyl)(fluorenyl). The ligand precursor is isolated by extraction from LiCl with a suitable hydrocarbon solvent such as pentane, methylene chloride, or toluene, followed by solvent evaporation. The ligand dianion is obtained in THF from reaction of $Me_2Si(3$-t-butyl-$5$-methyl-cyclopentadienyl)(fluorenyl) with 2 equivalents of methyl lithium. $Me_2Si(3$-t-butyl-$5$-methyl-cyclopentadienyl)(fluorenyl) $Li_2.n(THF)$ mixtures with $ZrCl_4$ in pentane or cold methylene chloride yield $Me_2Si(3$-t-butyl-$5$-methyl-cyclopentadienyl)(fluorenyl)$ZrCl_2$.

Literature preparations for dialkylcylopentadienes and their dialkylcyclopentenone precursors in high yields are cited in H. O. House, "Modern Synthetic Reactions," 2nd Ed., W. A. Benjamin, Inc., Menlo Park, California, Reading, Massachusetts, London, Amsterdam, Don Mills, Ontario, Sydney, pp. 642, 643, and 795, 1972. Also L. Skatterbol at Union Carbide described the synthesis of other (and otherwise) dialkyl cyclopentadienides and fulvenes in Tetrahedron, 1967, Vol. 23, pp. 1107 to 1117; Tetrahedron Letters No. 53, pp. 4659–4662 (1969) and the Journal of Organic Chemistry 29, 2951 (1964). Additionally, other syntheses of substituted cyclopentadienes can be found in C. Janiak and H. Schumann's article in Advances in Organometallic Chemistry, vol. 33, pp. 291–390 (1991 Academic Press).

The following examples illustrate various bridged cationic metallocene catalysts used in producing polypropylene in accordance with the invention.

COMPARATIVE EXAMPLE 1

A one liter reactor is charged with 200 mL of distilled, degassed toluene and is held at $20°$ C. 10 mL of a 0.8M methylalumoxane (MAO) toluene solution is added to the reactor. Next, 10 mL of toluene containing 10.0 mg of rac-$Me_2Si$[-trimethylsilyl-cyclopentadienyl]$_2ZrCl_2$ was added to the reactor. Polymerization is initiated by adding 100 mL of propylene at $20°$ C. The contents are stirred 30 minutes to obtain a 48% yield of a 63,000Mw isotactic polypropylene with a dsc melting point of $142°$ C.

EXAMPLE 2

The same procedure as Example 1 is followed except that 10.0 mg of rac-$Me_2Si$[3-trimethylsilyl-2-methyl-cyclopentadienyl]$_2ZrCl_2$ is used. The polymer analyses show a much higher dsc melting point and a higher molecular weight than obtained in Example 1.

COMPARATIVE EXAMPLE 3

The same procedure as Example 1 is followed except that 10.0 mg of $Me_2C$[3,4-di-t-butyl-cyclopentadienyl]$_2ZrCl_2$ is used.

EXAMPLE 4

The same procedure as Example 1 is followed except that 10.0 mg of $Me_2C$[3,4-di-t-butyl-cyclopentadienyl][2,5- dimethyl-cyclopentadienyl]ZrCl$_2$ is used. In comparing the syndiotactic polypropylene of Comparative Example 3 to this polypropylene shows this polypropylene to be of higher stereospecificity and to have reduced meso triad defects.

COMPARATIVE EXAMPLE 5

The same procedure as Example 1 is followed except that 10.0 mg of Me$_2$C[cyclopentadienyl][fluorenyl]ZrCl$_2$ is used.

EXAMPLE 6

The same procedure as Example 1 is followed except that 10.0 mg of Me$_2$C[2-methyl-cyclopentadienyl][fluorenyl]ZrCl$_2$ is used. In comparing the syndiotactic polypropylene of Comparative Example 5 to this polypropylene shows this polypropylene to be of higher stereospecificity and to have reduced meso triad defects.

While in accordance with the patent statutes, the best mode and preferred embodiments of the invention have been described, it is to be understood that the invention is not limited thereto, but rather is to be measured by the scope and spirit of the appended claims.

I claim:

1. A metallocene catalyst for preparing syndiospecific polyolefins comprising a catalyst or catalyst precursor characterized by formula (V):

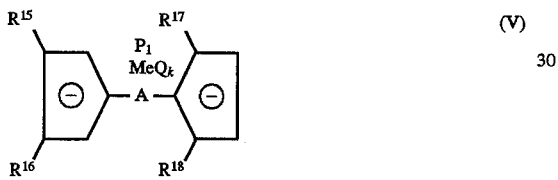

where:

A is a structural bridge selected from the group consisting of a C1–C20 alkenyl radical, a peralkylated C1–C20 alkenyl radical, a dialkyl methylene radical, a C3–C12 cyclohydrocarbyl radical, an aryl radical, a diarylmethylene radical, a diaryl allenyl radical, a silicon hydrocarbyl radical, a dihydrocarbyl silenyl radical, a germanium hydrocarbyl radical, a phosphorus hydrocarbyl radical, a nitrogen hydrocarbyl radical, a boron hydrocarbyl radical, and an aluminum hydrocarbyl radical;

$R^{15}$ and $R^{16}$ are the same or different radicals and are a linear or branched C1–C20 hydrocarbyl radical, a linear or branched C1-C20 halocarbyl radical, a C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorus hydrocarbyl radical, a nitrogen hydrocarbyl radical, a boron hydrocarbyl radical, an aluminum hydrocarbyl radical, or a Cl atom, a Br atom, or an I atom;

$R^{17}$ and $R^{18}$ are the same or different radicals as described for $R^{15}$ and $R^{16}$;

Me is a Group 3, 4, or 5 metal, or Lu, La, Nd, or Sm;

Q is a hydrocarbyl radical or halogen atom;

P is a stable non-coordinating or pseudo-non-coordinating artion;

k is an integer having a value from 0 to 2;

l is an integer having a value from 0 to 2; and the overall catalyst has $C_s$ or pseudo-$C_s$ symmetry.

2. A metallocene catalyst for preparing syndiospecific polyolefins comprising a catalyst or catalyst precursor characterized by formula (VI):

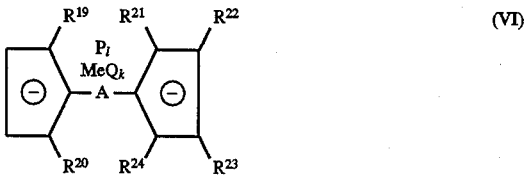

where:

A is a structural bridge selected from the group consisting of a C1–C20 alkenyl radical, a peralkylated C1–C20 alkenyl radical, a dialkyl methylene radical, a C3–C12 cyclohydrocarbyl radical, an aryl radical, a diarylmethylene radical, a diaryl allenyl radical, a silicon hydrocarbyl radical, a dihydrocarbyl silenyl radical, a germanium hydrocarbyl radical, a phosphorus hydrocarbyl radical, a nitrogen hydrocarbyl radical, a boron hydrocarbyl radical, and an aluminum hydrocarbyl radical;

$R^{19}$ and $R^{20}$ are the same or different radicals and are a linear or branched C1–C20 hydrocarbyl radical, a linear or branched C1–C20 halocarbyl radical, a C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorus hydrocarbyl radical, a nitrogen hydrocarbyl radical, a boron hydrocarbyl radical, an aluminum hydrocarbyl radical, a Cl atom, a Br atom, or an I atom;

$R^{21}$ and $R^{22}$ and $R^{23}$ and $R^{24}$ are the same or different radicals as described for $R^{19}$ and $R^2$ and $R^{21}$ and $R^{22}$ or $R^{23}$ and $R^{24}$ can be joined together into saturated, unsaturated or aromatic fused ring;

Me is a Group 3, 4, or 5 metal, or Lu, La, Nd, or Sin;

Q is a hydrocarbyl radical or halogen atom;

P is a stable non-coordinating or pseudo-non-coordinating anion;

k is an integer having a value from 0 to 2;

l is an integer having a value from 0 to 2; and the overall catalyst has $C_s$ or pseudo-$C_s$ symmetry.

3. A metallocene catalyst for preparing syndiospecific polyolefins comprising a catalyst or catalyst precursor characterized by formula (VII):

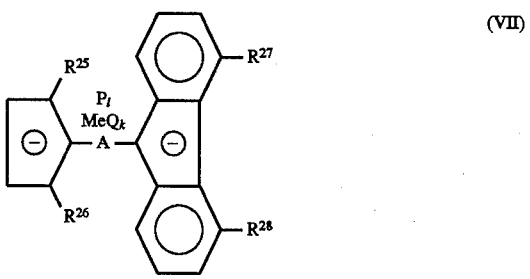

where:

A is a structural bridge selected from the group consisting of a C1–C20 alkenyl radical, a peralkylated C1–C20 alkenyl radical, a dialkyl methylene radical, a C3–C12 cyelohydroeaxbyl radical, an aryl radical, a diarylmethylene radical, a diaryl allenyl radical, a silicon hydroearbyl radical, a dihydrocarbyl silenyl radical, a germanium hydrocarbyl radical, a phosphorus hydrocarbyl radical, a nitrogen hydrocarbyl radical, a boron hydrocarbyl radical, and an aluminum hydrocarbyl radical;

$R^{25}$ and $R^{26}$ are the same or different radicals and are a linear or branched C1–C20 hydrocarbyl radical, a linear or branched C1–C20 halocarbyl radical, a C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorus hydrocarbyl radical, a nitrogen hydrocarbyl radical, a boron hydrocarbyl radical, an aluminum hydrocarbyl radical, a Cl atom, a Br atom, or an I atom;

$R^{27}$ and $R^{28}$ are the same or different and are a hydrogen atom or a radical as described for $R^{25}$ and $R^{26}$;

Me is a Group 3, 4, or 5 metal, or Lu, La, Nd, or Sm;

Q is a hydrocarbyl radical or halogen atom;

P is a stable non-coordinating or pseudo-non-coordinating anion;

k is an integer having a value from 0 to 2;

l is an integer having a value from 0 to 2; and the overall catalyst has $C_s$ or pseudo-$C_s$ symmetry.

4. A metallocene catalyst or catalyst precursor for preparing syndiospecific polyolefins comprising a metallocene characterized by formula (I):

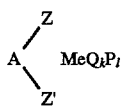

where:

A is a structural bridge selected from the group consisting of a C1–C20 alkenyl radical, a peralkylated C1–C20 alkenyl radical, a dialkyl methylene radical, a C3–C12 cyclohydrocarbyl radical, an aryl radical, a diarylmethylene radical, a diaryl allenyl radical, a silicon hydrocarbyl radical, a dihydrocarbyl silenyl radical, a germanium hydrocarbyl radical, a phosphorus hydrocarbyl radical, a nitrogen hydrocarbyl radical, a boron hydrocarbyl radical, and an aluminum hydrocarbyl radical;

Z is a cyclopentadienyl radical having a 2,5 substitution pattern where the 2,5 substituents on the Z radical are a linear or branched C1–C20 hydrocarbyl radical, a linear or branched C1–C20 halocarbyl radical, a C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorus hydrocarbyl radical, a nitrogen hydrocarbyl radical, a boron hydrocarbyl radical, an aluminum hydrocarbyl radical, a Cl atom, a Br atom, or an I atom;

Z' is a fluorenyl radical;

Me is a Group 3, 4, or 5 metal or Lu, La, Nd, or Sm;

Q is a hydrocarbyl radical or halogen atom;

P is a stable non-coordinating or pseudo-non-coordinating anion;

k is an integer having a value from 0 to 2;

l is an integer having a value from 0 to 2; and the overall catalyst has $C_s$ or pseudo-$C_s$ symmetry.

5. A metallocene catalyst or catalyst precursor for preparing syndiospecific polyolefins comprising a metallocene characterized by formula (I):

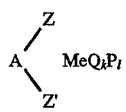

where:

A is a structural bridge selected from the group consisting of a C1–C20 alkenyl radical, a peralkylated C1–C20 alkenyl radical, a dialkyl methylene radical, a C3–C12 cyclohydrocarbyl radical, an aryl radical, a diarylmethylene radical, a diaryl allenyl radical, a silicon hydrocarbyl radical, a dihydrocarbyl silenyl radical, a germanium hydrocarbyl radical, a phosphorus hydrocarbyl radical, a nitrogen hydrocarbyl radical, a boron hydrocarbyl radical, and an aluminum hydrocarbyl radical;

Z is a cyclopentadienyl radical where the 2 and 5 positions of the Cp ring bear substituents sterically larger than a hydrogen atom and Z' is a cyclopentadienyl radical where at least the 3 and 4 positions of the Cp ring bear substituents sterically larger than a hydrogen atom and where the 3,4 substituents can be part of a saturated or unsaturated fused ring and where the 2,5 substituents on Z and the 3,4 substituents on Z' are a linear or branched C1–C20 hydrocarbyl radical, a linear or branched C1–C20 halocarbyl radical, a C1–C20 hydrohalocarbyl radical, a linear or branched C1–C20 alkoxy radical, a C3–C12 cyclohydrocarbyl radical, a C3–C12 cyclohydrohalocarbyl radical, an aryl radical, an alkylaryl radical, an arylalkyl radical, a silicon hydrocarbyl radical, a germanium hydrocarbyl radical, a phosphorus hydrocarbyl radical, a nitrogen hydrocarbyl radical, a boron hydrocarbyl radical, an aluminum hydrocarbyl radical, a Cl atom, a Br atom, or an I atom;

Me is a Group 3, 4, or 5 metal, or Lu, La, Nd, or Sm;

Q is a hydrocarbyl radical or halogen atom;

P is a stable non-coordinating or pseudo-non-coordinating anion;

k is an integer having a value from 0 to 2;

l is an integer having a value from 0 to 2; and the overall catalyst has $C_s$ or pseudo-$C_s$ symmetry.

6. The metallocene catalyst of claim 5, wherein A is a methylene, an ethylene, an isopropylidene, or a dialkylsilenyl radical.

7. The metallocene catalyst of claim 5, wherein Z' is a cyclopentadienyl radical where at least the 3 and 4 positions of the Cp ring bear substituents sterically larger than a methyl group.

* * * * *